United States Patent [19]

Friedman et al.

[11] 4,067,292
[45] Jan. 10, 1978

[54] DEVICE FOR COATING POPCORN

[76] Inventors: Aaron M. Friedman; Jean J. Friedman, both of 27501 Kingsgate Way, Apt. 1, Farmington, Mich. 48024

[21] Appl. No.: 441,368

[22] Filed: Feb. 11, 1974

Related U.S. Application Data

[63] Continuation of Ser. No. 250,603, May 5, 1972, abandoned.

[51] Int. Cl.² .............................................. A23G 3/26
[52] U.S. Cl. ...................................... 118/19; 118/418; 118/500; 248/130; 248/313; 403/388
[58] Field of Search ................. 118/19, 500, 503, 417, 118/418; 117/109; 51/164; 24/73 R, 73 M, 221 R, 211 K; 248/311, 313, 226 A, 130, 131

[56] References Cited

U.S. PATENT DOCUMENTS

| | | | |
|---|---|---|---|
| 1,801,637 | 4/1931 | Nichols | 248/226 A |
| 1,855,009 | 4/1932 | Clegg | 248/313 |
| 2,912,769 | 11/1959 | Kruger | 248/313 X |
| 3,045,987 | 7/1962 | Cake | 259/72 |
| 3,180,605 | 4/1965 | Ewaskowitz, Jr. | 248/226 A |
| 3,302,608 | 2/1967 | Coons et al. | 118/19 |

FOREIGN PATENT DOCUMENTS

| | | | |
|---|---|---|---|
| 416,623 | 12/1946 | Italy | 118/418 |

Primary Examiner—Mervin Stein
Assistant Examiner—Morris Kaplan
Attorney, Agent, or Firm—Gifford, Chandler, Sheridan & Sprinkle

[57] ABSTRACT

A device suitable for coating popcorn with cheese, butter, or the like comprises an axle positioned at an acute angle to a horizontal plane, means for rotating the axle, and four vessel-gripping prongs releasably secured to the axle for rotation therewith. The prongs, which are formed from two U-shaped members, are spaced radially from each other and each has a portion which lies generally parallel to the axis of rotation of the axle.

3 Claims, 4 Drawing Figures

DEVICE FOR COATING POPCORN

RELATIONSHIP TO OTHER APPLICATIONS

This application is a continuation application of Ser. No. 250,603 filed May 5, 1972, now abandoned.

BACKGROUND OF THE INVENTION

The art of coating small particles (buttons, pills, candy, etc.) is an old one. For example, Wathew in U.S. Pat. No. 59,325 (1866) described a rotating confection pan in which almonds, for example, were coated with sugar. Smith in U.S. Pat. No. 111,882 (1871) described a rotating cylinder in which buttons were coated with varnish. Similarly, Upjohn in U.S. Pat. No. 312,041 (1885) described a rotating pan in which pills were coated with sugar. In each of the foregoing examples, the particle-containing vessel was rotated on an axis which forms an acute angle with a horizontal plane.

Improvements in the art took the form of relatively more complicated devices wherein the particle-containing vessel was rotated about either a vertical or horizontal axis, with provision for turning the plane of the vessel for purposes of dumping the contents. An example of such devices is shown in U.S. Pat. No. 3,095,326 issued to Green et al in 1963.

Small volume usage of such devices, as would occur in the case of coating popcorn in the home or at a theatre refreshment stand, is precluded by the relative complexity of even the early devices. A particularly unsatisfactory characteristic of all devices of the art is not only that the vessel is not readily removable from the device but the parts of the device which require regular cleaning are not readily separated from each other.

It is a specific object of the present invention to provide a device which can be disassembled in a matter of seconds.

SUMMARY OF THE INVENTION

The device of the present invention, suitable for coating popcorn, provides means for gripping the popcorn-holding vessel in a manner such that the vessel is removable by simply lifting it away from a plurality of vessel-gripping prongs. Further, the device of the invention provides means for securing the vessel-gripping prongs to an axle in a manner such that an assembly can be disassembled by a simple finger movement of the operator. Thus, the inventive device comprises an axle positioned at an acute angle to a horizontal plane; means for rotating said axle, such as a hand crank; and a plurality of prongs, usually four, which are releasably secured to the axle for rotation therewith. The prongs are preferably formed from two U-shaped members, are spaced radially from each other and have vessel-gripping portions which lie generally parallel to each other and to the axis of rotation of the axle.

DESCRIPTION OF THE PREFERRED EMBODIMENT

Figure 1:
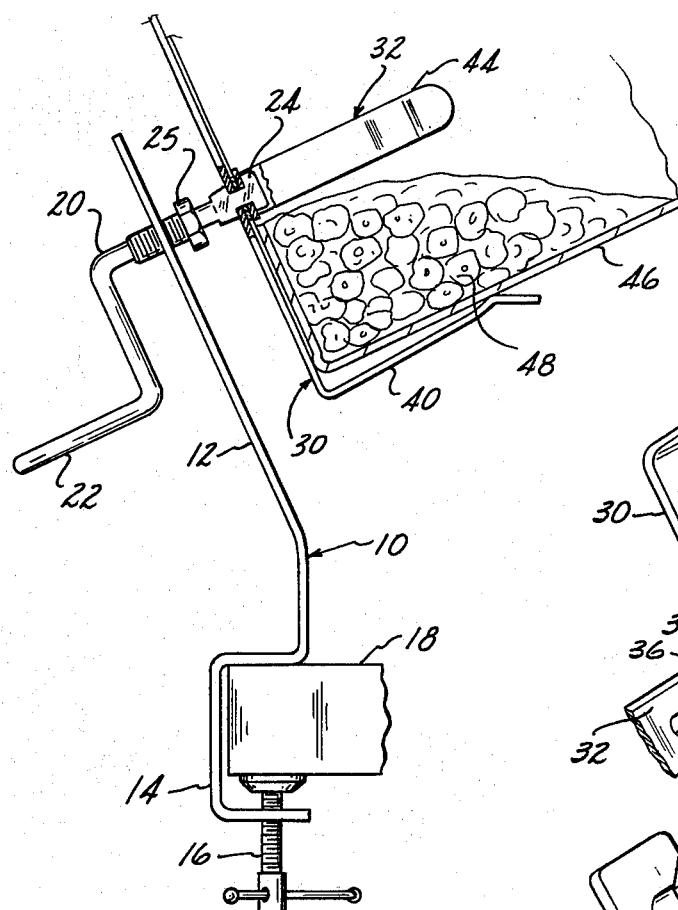
FIG. 1 is an elevation view of the device of the invention holding a popcorn container.
Figure 2:
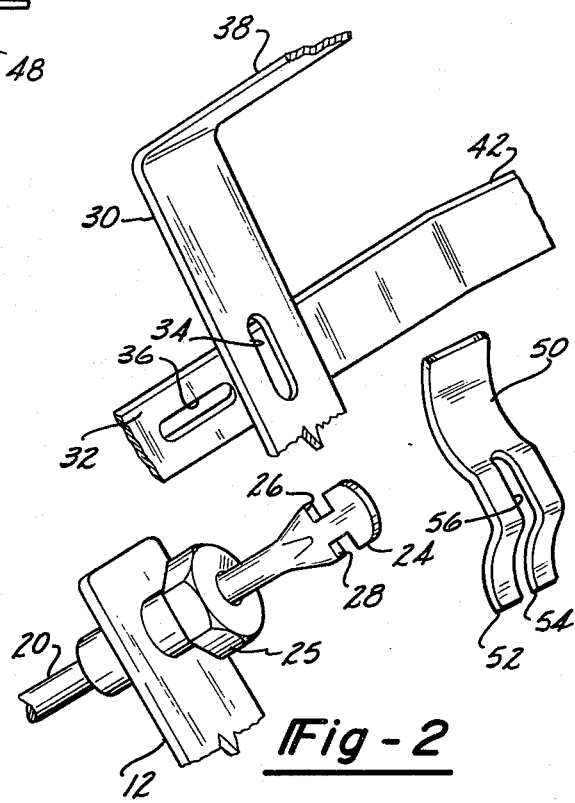
FIG. 2 is an exploded view, in perspective, of parts of the device of the invention.

A support member 10 has a portion 12 which extends upwardly and at an acute angle from vertical. The support member 10 also has a U-shaped clamp member 14 with a tightening bolt member 16 for rigidly securing the support member 10 to a table 18, or the like. The portion 12, as shown, extends upwardly at an angle of about 25° from vertical.

An axle 20 is provided with a crank handle 22 on one end thereof and with a flattened portion 24 on the other end thereof. The axle 20 is rotatably mounted in a threaded collar member 25 threaded into the shaft portion 12. The flattened portion 24 is provided with indentations 26, 28. U-shaped members, generally indicated by 30, 32, are each provided with a slot 34, 36, respectively, and with two prongs 38, 40, 42, 44 extending outwardly, generally parallel to the axle 20, to grip the vessel 46 which contains popcorn 48 for example. The U-shaped members 30, 32, slip over the flattened portion 24 of the axle 20 and press inwardly against the rounded portion of the axle. A resilient, pressure-exerting spacer member 50 with two legs 52, 54 and a recess 56 straddles the axle 20 in a manner such that recess 56 receives the axle 20 therein and axle indentations 26, 28 respectively receive legs 52, 54 therein.

Figure 3:
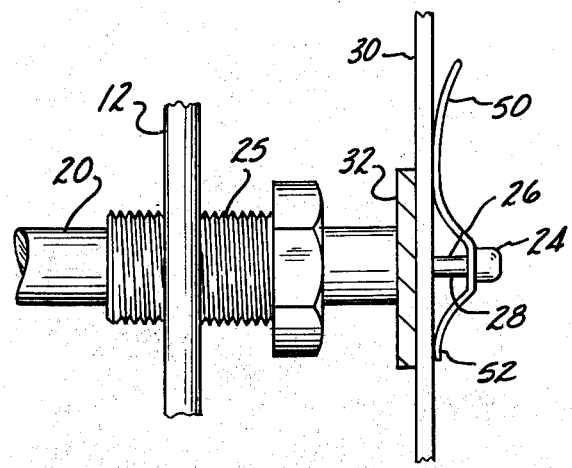
FIG. 3 is an enlarged elevation view of a part of the device illustrating one way of releasably securing the vessel-gripping assembly to the axle of the device of the invention using the parts illustrated in FIG. 2.

To disassemble the device, the spacer 50 is slid upwardly (see FIG. 3) away from axle 20 and the U-shaped members 30, 32 are slid out over the flattened end 24 of the axle 20, which movement automatically disengages the two U-shaped members 30, 32 from each other. This simple and rapid disassembly procedure provides for the easy cleaning of the parts of the device.

Figure 4:
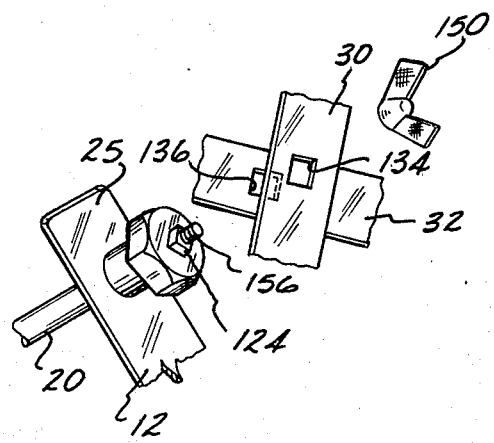
FIG. 4 is a fragmentary exploded view illustrating another means for attaching the prong members to the axle.

FIG. 4 illustrates another embodiment in which the members 30, 32 are provided with square slots 134 and 136 which fit over a squared end 124 of the axle 20. A wing nut 150 is received by a threaded end portion 156 of the axle 20 to lock the members, 30, 32 to the axle 20.

In operation, a can 46, or other vessel, containing popcorn 48 or the like, is positioned between the prongs 38, 40, 42, 44 which hold the can by the spring pressure of the prongs. The can 46 is then rotated by turning of the crank handle 22. While the can is being rotated, liquid cheese or butter, for example, can be added to effect a coating of the popcorn 48. As shown in FIG. 1, the axis of the can extends upwardly at an angle of about 25° from horizontal, said axis being perpendicular to the portion 12 of the support member 10 which extends upwardly at an angle of about 25° from vertical (as shown in FIG. 1). Such angle of about 25° appears to give maximum tumbling of the popcorn during rotation while simultaneously providing an easy access to the open, or outer end, of the can 46.

What is claimed is:

1. A device suitable for coating popcorn in a rotating vessel, said device comprising (a) an axle positioned to form an acute angle with a horizontal plane; (b) means for rotating said axle; (c) a plurality of prongs releasable secured to said axle for rotation therewith, said prongs each having a portion lying generally parallel to the axis of rotation of said axle, and said prong portions being spaced radially from each other and adapted to grip said vessel therebetween; (d) wherein there are four prongs formed from two U-shaped members releasably secured to said axle with the bases of said members positioned at right angles to each other; (e) said axle being generally cylindrical and is flattened at one end thereof, said end being provided with oppositely disposed radial indentations; (f) each of said bases of said U-shaped members being provided with a slot to permit said members to pass over said flattened end of said axle; and (g) said device further comprising a spring pressure-exerting spacer member comprising two legs and a recess therebetween, wherein said spacer member is adapted to be slidably fixed into said indentations to straddle said axle, to press resiliently inwardly against said U-shaped members, and to press resiliently outwardly against said flattened end of said axle.

2. A device suitable for coating popcorn in a rotating vessel, said device comprising: (a) a supporting member having a portion which extends upwardly at an acute angle from vertical; (b) means at the bottom of said supporting member for rigidly securing said member in a generally upright position; (c) a generally cylindrical axle supported by and extending transversely through said portion, said axle being provided on one end thereof with a handle for rotating said axle and being flattened on the other end thereof, said flattened end being provided with oppositely disposed radial indentations; (d) a vessel-gripping assembly comprising two U-shaped members, each with two prongs extending generally parallel to said axle, said U-shaped members being releasably secured to each other and to said axle and spaced radially from each other to present four vessel-gripping prongs extending outwardly and upwardly at an acute angle from horizontal; and (e) a pressure exerting spacer member slidably fixed into said indentations, resiliently pressing inwardly against said U-shaped members, and resiliently pressing outwardly against said flattened end of said axle.

3. The device according to claim 1 wherein said acute angles are each about 25°.

* * * * *